United States Patent
Huang et al.

(10) Patent No.: US 12,469,937 B2
(45) Date of Patent: Nov. 11, 2025

(54) CYLINDRICAL LITHIUM-ION BATTERY

(71) Applicant: EVE POWER CO., LTD., Hubei (CN)

(72) Inventors: Liming Huang, Hubei (CN); Liangliang Yue, Hubei (CN); Jing Liu, Hubei (CN); Yuebin Xu, Hubei (CN); Wei He, Hubei (CN)

(73) Assignee: EVE POWER CO., LTD., Hubei (CN)

( * ) Notice: Subject to any disclaimer, the term of this patent is extended or adjusted under 35 U.S.C. 154(b) by 175 days.

(21) Appl. No.: 18/013,953

(22) PCT Filed: May 20, 2022

(86) PCT No.: PCT/CN2022/094126
§ 371 (c)(1),
(2) Date: Dec. 30, 2022

(87) PCT Pub. No.: WO2022/242751
PCT Pub. Date: Nov. 24, 2022

(65) Prior Publication Data
US 2024/0106089 A1    Mar. 28, 2024

(30) Foreign Application Priority Data
May 21, 2021   (CN) .......................... 202121100873.1

(51) Int. Cl.
*H01M 50/538*   (2021.01)
*H01M 10/04*   (2006.01)
(Continued)

(52) U.S. Cl.
CPC ..... *H01M 50/538* (2021.01); *H01M 10/0431* (2013.01); *H01M 10/0525* (2013.01);
(Continued)

(58) Field of Classification Search
None
See application file for complete search history.

(56) References Cited

U.S. PATENT DOCUMENTS

2014/0205868 A1   7/2014  Phillips
2023/0118321 A1*  4/2023  Fang .................... H01M 50/55
                                                        429/163

FOREIGN PATENT DOCUMENTS

CN   101404338 A   4/2009
CN   203423233 U   2/2014
(Continued)

OTHER PUBLICATIONS

Machine translation of the abstract of JP63-086250A, published on Apr. 16, 1988 (Year: 1988).*
(Continued)

*Primary Examiner* — Anca Eoff
(74) *Attorney, Agent, or Firm* — McDonald Hopkins LLC

(57) ABSTRACT

Provided is a cylindrical lithium-ion battery including a negative cap and a cylindrical case. A jellyroll and a negative current collector are arranged inside the case. A sidewall of an end of the case is provided with an annular inwardly-concaved groove arranged circumferentially around a central axis of the case, and forms an annular protrusion at the inside of the case. The negative current collector is connected to a negative electrode of the jellyroll. A portion, located below the annular inwardly-concaved groove, of the case is bent to form an annular engaging groove, an opening of the annular engaging groove faces the interior of the case, the periphery of the negative cap is arranged in the annular engaging groove, and a bottom surface of the negative cap and the annular engaging groove are connected in a sealed manner by laser welding.

10 Claims, 3 Drawing Sheets

(51) Int. Cl.
    *H01M 10/0525*    (2010.01)
    *H01M 50/107*     (2021.01)
    *H01M 50/152*     (2021.01)
    *H01M 50/169*     (2021.01)
    *H01M 50/186*     (2021.01)
    *H01M 50/474*     (2021.01)

(52) U.S. Cl.
    CPC ....... *H01M 50/107* (2021.01); *H01M 50/152* (2021.01); *H01M 50/169* (2021.01); *H01M 50/186* (2021.01); *H01M 50/474* (2021.01)

(56) References Cited

FOREIGN PATENT DOCUMENTS

| | | | |
|---|---|---|---|
| CN | 111009693 | A | 4/2020 |
| CN | 113346201 | A | 9/2021 |
| CN | 215578775 | U | 1/2022 |
| CN | 215578776 | U | 1/2022 |
| DE | 202022003062 | U1 | 8/2024 |
| EP | 4123794 | A1 | 1/2023 |
| JP | 63086250 | A * | 4/1988 |
| JP | 2005129433 | A * | 5/2005 |
| JP | 2017027780 | A | 2/2017 |
| WO | 2020111275 | A1 | 6/2020 |

OTHER PUBLICATIONS

International Search Report mailed Jul. 29, 2022; International Patent Application No. PCT/2022/094126.
Extended European Search Report dated Aug. 5, 2024. European Patent Application No. 22804070.5. 10 pages.

\* cited by examiner

CYLINDRICAL LITHIUM-ION BATTERY

CROSS-REFERENCE TO RELATED APPLICATIONS

This application is a U.S. National Stage Application filed under 35 U.S.C. 371 of International Patent Application No. PCT/CN2022/094126 filed on May 20, 2022 which claims the priority of Chinese Patent Application No. 202121100873.1, filed with the Chinese Intellectual Property Administration on May 21, 2021, the disclosures of which are incorporated herein by reference in their entireties.

TECHNICAL FIELD

The present application relates to the field of lithium-ion batteries, for example, to a cylindrical lithium-ion battery.

BACKGROUND

Lithium-ion batteries are widely used in devices such as smartphones and new energy vehicles because of their advantages such as high energy density, high power density, long cycle life, and absence of memory effects. The cylindrical lithium-ion battery in the related art generally includes a case, a jellyroll and an electrolyte which are arranged in an accommodating cavity of the case. In order to keep the performance of the lithium-ion battery stable, a high requirement is imposed on the hermetic performance of the lithium-ion battery.

The cylindrical lithium-ion battery in the related art is a cylindrical lithium-ion battery provided with a negative cap, and the connection of the negative cap with the case in assembling has a poor reliability, the negative cap has a risk of being cracked or disconnected when it is under certain conditions such as being subjected to vibration, pressure, therefore, there is a significant potential safety hazard.

SUMMARY

A cylindrical lithium-ion battery is provided according to the present application, which includes a negative cap, and a connection structure for connecting the negative cap to a case can meet the requirements for hermetic performance of the cylindrical lithium-ion battery.

The following technical solution is adopted in the present application. A cylindrical lithium-ion battery, includes a negative cap and a cylindrical case, specifically, the negative cap is arranged at one end of the case. A jellyroll and a negative current collector are arranged inside the case. A sidewall of a bottom of the case is provided with an annular inwardly-concaved groove, the annular inwardly-concaved groove is arranged circumferentially around a central axis of the case, and forms an annular protrusion at the inside of the case. The negative current collector is connected to a negative electrode of the jellyroll. A portion, located below the annular inwardly-concaved groove, of the case is bent to form an annular engaging groove, an opening of the annular engaging groove faces the interior of the case, the periphery of the negative cap is arranged in the annular engaging groove, and a bottom surface of the negative cap and the annular engaging groove are connected in a sealed manner by laser welding.

REFERENCE NUMERALS IN THE DRAWINGS

| | |
|---|---|
| 1. negative cap; | |
| 2. case; | 21. annular inwardly-concaved groove; |
| 22. annular engaging groove; | 23. through hole; |
| 3. negative current collector; | 4. jellyroll; |
| 5. positive pole; | 6. positive current collector; |
| 7. insulation sealing member; | 8. supporting block. |

DETAILED DESCRIPTION

It is to be understood that the embodiments described herein are intended to illustrate rather than limiting the present application.

Figure 1:
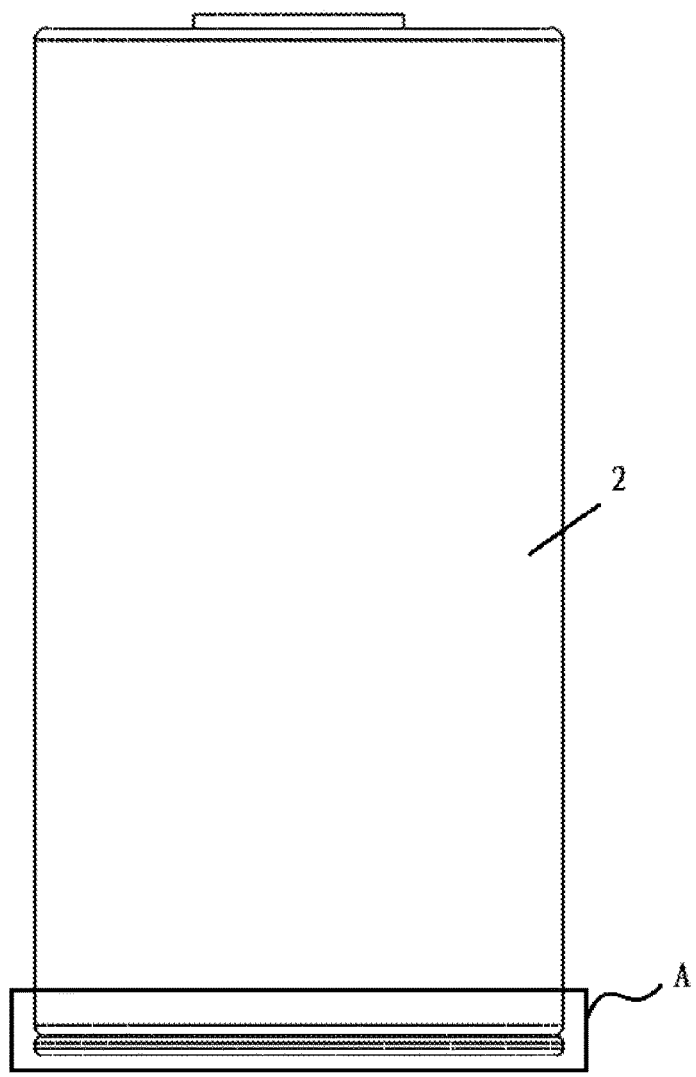
FIG. 1 is a schematic structural diagram of a cylindrical lithium-ion battery according to an embodiment of the present application.
Figure 2:
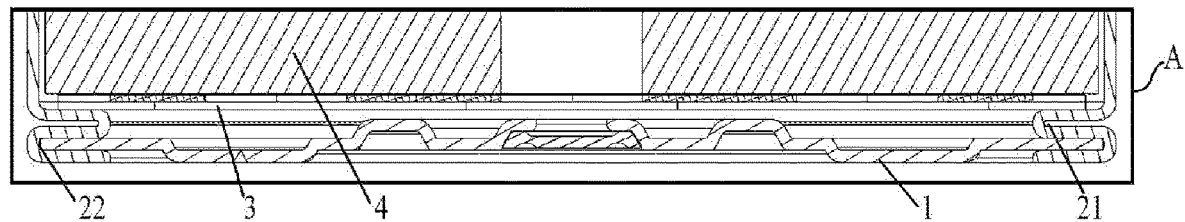
FIG. 2 is a cross-sectional view of a part A in FIG. 1.
Figure 3:
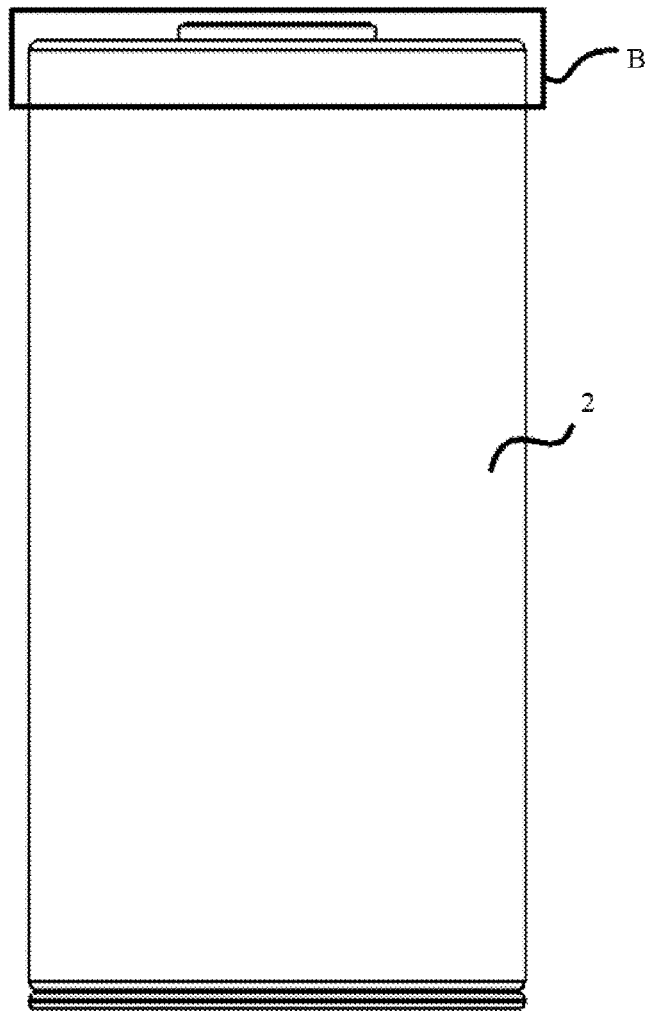
FIG. 3 is a front view of a cylindrical battery according to an embodiment of the present application.
Figure 4:
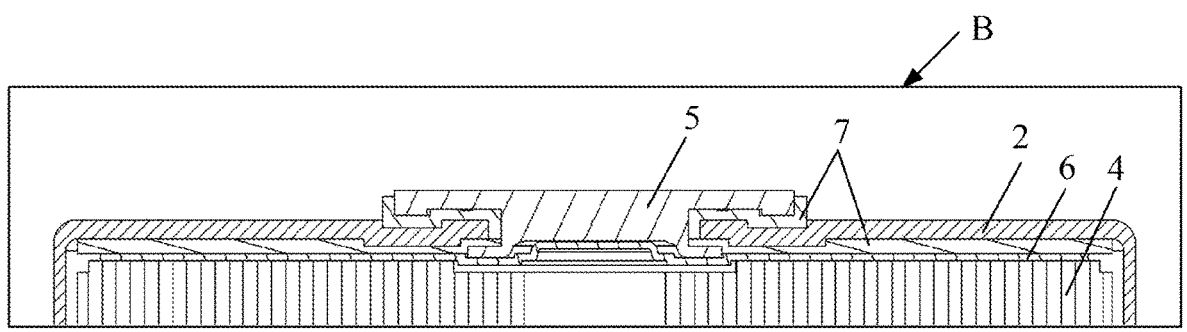
FIG. 4 is a cross-sectional view of a part B in FIG. 3.
Figure 5:
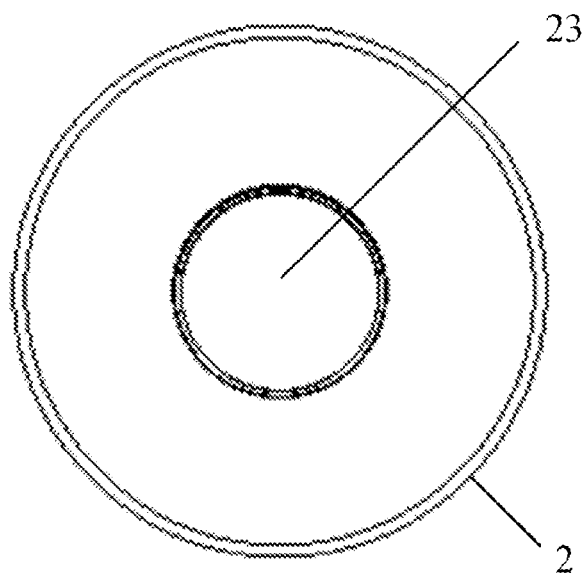
FIG. 5 is a top view of a case according to an embodiment of the present application.
Figure 6:
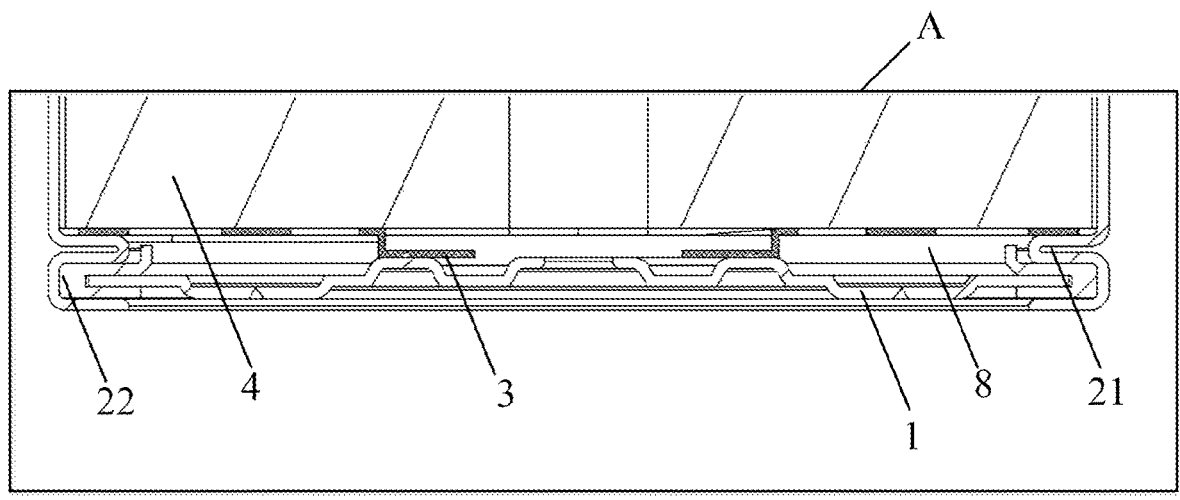
FIG. 6 is a cross-sectional view of the part A in FIG. 1 according to another embodiment of the present application.

As shown in FIG. 1 and FIG. 2, a cylindrical lithium-ion battery according to an embodiment of the present application includes a negative cap 1 and a cylindrical case 2, and the negative cap 1 is arranged at the bottom of the case 2. A jellyroll 4 and a negative current collector 3 are arranged inside the case 1, and after the negative cap 1 and the case 2 are assembled and connected, the inside of the case 2 is in a sealed state.

A sidewall of a bottom of the case 2 is provided with an annular inwardly-concaved groove 21, the annular inwardly-concaved groove 21 is arranged circumferentially around a central axis of the case 2, and forms an annular protrusion at the inside of the case 2, and the annular protrusion supports the negative current collector 3. The negative current collector 3 is connected to a negative electrode of the jellyroll 4. A portion, located below the annular inwardly-concaved groove, of the case 2 is bent to form an annular engaging groove 22, a groove opening of the annular engaging groove 22 faces towards the interior of the case 2, the periphery of the negative cap 1 is arranged in the annular engaging groove 22, and a bottom surface of the negative cap 1 and the annular engaging groove 22 are connected in a sealed manner by laser welding.

The multiple technical features of the embodiments described above may be combined arbitrarily. For the sake of brevity, not all possible combinations of the multiple technical features of the embodiment described above are described. However, the combinations of these technical features should be considered to be within the scope of the present description as long as no contradictions exist in their combinations.

The negative cap is electrically connected to the case by laser welding. In an embodiment, the annular protrusion supports the negative current collector, the negative current collector is in contact with the annular protrusion so as to be electrically connected to the case, therefore, the negative current collector is electrically connected to the negative cap through the case.

In an embodiment, a top surface and the bottom surface of the negative cap 1 are each in close contact with an inner sidewall of the annular engaging groove 22.

The present application employs a technical solution as follow. A cylindrical lithium-ion battery includes a negative cap and a cylindrical case, and the negative cap is arranged at one end of the case. A jellyroll, current collectors (including a positive current collector and a negative current collector) connected to two ends of the jellyroll respectively and an electrolyte filled in the case are arranged inside the case, and after the negative cap and the case are assembled and connected, the inside of the case is in a sealed state.

In the cylindrical lithium-ion battery according to an embodiment of the present application, the bottom end surface of the negative cap and the battery case are connected in a sealed manner by laser welding, so the structure is firm and the hermetic performance is good. The negative current collector is located right above the negative cap, the negative current collector is in close contact with the annular protrusion, and the negative cap and the annular engaging groove are in close contact, therefore, it is not necessary for the negative current collector to extend therefrom a tab for connection to the negative cap, and the negative current collector and the negative cap can be electrically connected by the case, thus, both the negative cap and the case are negatively charged.

As shown in FIG. 3 to FIG. 6, in an embodiment, the lithium-ion battery further includes a positive pole 5 and an insulation sealing member 7, a through hole 23 is provided in a central portion of the top of the case, and the through hole 23 is configured for mounting the positive pole 5 and the insulation sealing member 7.

In an embodiment, the lithium-ion battery further includes a positive current collector 6 connected to a positive electrode of the jellyroll, and the positive current collector 6 is electrically connected to one side, facing an inner side of the case, of the positive pole 5, thereby achieving a positive output of the battery.

In an embodiment, the negative current collector includes a supporting block 8, and the supporting block 8 is arranged to be electrically connected to the case, thereby achieving an electrical connection channel of the negative side of the jellyroll.

In an embodiment, three to six supporting blocks 8 are provided.

What is claimed is:

1. A cylindrical lithium-ion battery, comprising a negative cap, a case, a jellyroll, and a negative current collector, wherein the case is cylindrical;
the jellyroll and the negative current collector are arranged inside the case, a sidewall of a bottom of the case is provided with an annular inwardly-concaved groove, the annular inwardly-concaved groove is arranged circumferentially around a central axis of the case, and the annular inwardly-concaved groove forms an annular protrusion inside the case, the negative current collector is connected to a negative electrode of the jellyroll, a portion of the case located below the annular inwardly-concaved groove is bent to form an annular engaging groove, an opening of the annular engaging groove faces towards the interior of the case, a periphery of the negative cap is arranged in the annular engaging groove, and a bottom surface of the negative cap and the annular engaging groove are connected in a sealed manner by laser welding.

2. The cylindrical lithium-ion battery according to claim 1, wherein the negative cap is arranged at the bottom of the case.

3. The cylindrical lithium-ion battery according to claim 1, wherein the negative current collector is electrically connected to the negative cap through the case.

4. The cylindrical lithium-ion battery according to claim 3, wherein the annular protrusion supports the negative current collector.

5. The cylindrical lithium-ion battery according to claim 1, wherein a top surface and a bottom surface of the negative cap are each in contact with an inner sidewall of the annular engaging groove.

6. The cylindrical lithium-ion battery according to claim 1, further comprising a positive pole and an insulation sealing member, wherein a through hole is provided in a central portion of a top of the case, and the through hole is configured for mounting the positive pole and the insulation sealing member.

7. The cylindrical lithium-ion battery according to claim 6, further comprising a positive current collector connected to a positive electrode of the jellyroll, and the positive current collector is electrically connected to a side of the positive pole facing an inner side of the case.

8. The cylindrical lithium-ion battery according to claim 3, wherein the negative current collector comprises a supporting block arranged to be electrically connected to the case.

9. The cylindrical lithium-ion battery according to claim 8, wherein the negative current collector comprises three to six supporting blocks.

10. The cylindrical lithium-ion battery according to claim 1, wherein an electrolyte is filled in the case.

* * * * *